US009689723B2

(12) United States Patent
Efimov et al.

(10) Patent No.: US 9,689,723 B2
(45) Date of Patent: Jun. 27, 2017

(54) BATTERYLESS SIGNAL TRANSMITTER HAVING A WIEGAND SENSOR FOR GAS OR WATER METERS

(71) Applicant: Hengstler GmbH, Aldingen (DE)

(72) Inventors: George Efimov, Rottweil (DE); Michael Mixner, Villingen-Schwenningen (DE)

(73) Assignee: HENGSTLER GMBH, Aldingen (DE)

( * ) Notice: Subject to any disclaimer, the term of this patent is extended or adjusted under 35 U.S.C. 154(b) by 126 days.

(21) Appl. No.: 14/770,102

(22) PCT Filed: Jan. 25, 2014

(86) PCT No.: PCT/EP2014/000202
§ 371 (c)(1),
(2) Date: Aug. 25, 2015

(87) PCT Pub. No.: WO2014/131486
PCT Pub. Date: Sep. 4, 2014

(65) Prior Publication Data
US 2016/0003653 A1    Jan. 7, 2016

(30) Foreign Application Priority Data

Feb. 26, 2013 (DE) ........................ 10 2013 003 190

(51) Int. Cl.
*G01F 15/00* (2006.01)
*G01F 1/05* (2006.01)
*G01F 15/06* (2006.01)

(52) U.S. Cl.
CPC .............. *G01F 1/05* (2013.01); *G01F 15/066* (2013.01); *G01F 15/068* (2013.01)

(58) Field of Classification Search
USPC ....................................... 73/861.77
See application file for complete search history.

(56) References Cited

U.S. PATENT DOCUMENTS 3,820,090 A * 6/1974 Wiegand ................ G06K 7/083
148/120
5,530,298 A * 6/1996 Gerhold ................ G01F 15/066
307/106

(Continued)

FOREIGN PATENT DOCUMENTS

DE        443164 C    4/1927
DE       3046804 A1   7/1982
DE       4211704 A1  10/1993

(Continued)

*Primary Examiner* — Clayton E LaBalle
*Assistant Examiner* — Warren K Fenwick
(74) *Attorney, Agent, or Firm* — Browdy and Neimark, PLLC (57) ABSTRACT

Disclosed is a batteryless counter (1) for gas or water meters having at least one Wiegand sensor (2) or another power generating element and an evaluation circuit (10) connected thereto for processing a pulse (31), and the batteryless counter (1) feeds the pulses (31) generated and processed by the Wiegand sensor (2) to an isolator (17), and that at the output of this isolator (17) a pulse duration setting (18) is disposed, which processes the pulses (31) simultaneously counted via the counting circuit (4) by a pulse selection circuit (6) and converts the other pulse shapes/pulse frequencies and guides them outwards.

10 Claims, 8 Drawing Sheets

(56) References Cited

U.S. PATENT DOCUMENTS

| | | | |
|---|---|---|---|
| 6,612,188 B2 * | 9/2003 | Hamilton | ............... G01F 3/12 73/861.78 |
| 2006/0076948 A1 | 4/2006 | Gutierrez | |

FOREIGN PATENT DOCUMENTS

| | | |
|---|---|---|
| DE | 19714351 A1 | 10/1998 |
| DE | 10259223 B3 | 2/2004 |
| EP | 0658745 A2 | 6/1995 |
| WO | 0017997 A1 | 3/2000 |
| WO | 02001166 A1 | 1/2002 |
| WO | 2012092940 A1 | 7/2012 |

* cited by examiner

BATTERYLESS SIGNAL TRANSMITTER HAVING A WIEGAND SENSOR FOR GAS OR WATER METERS

The present invention relates to a batteryless signal transmitter having a Wiegand sensor according to the preamble of Patent Claim 1.

In previously known gas or water meters, the counter reading is electronically read out and digitally processed. According to the related art, it is known to additionally use so-called low frequency (LF) or high frequency (HF) signal transmitters.

The LF applications are used in rotary gas meters having a low number of revolutions. Additionally, so-called flow computers (for example, volume converters, etc.) which, having additional measuring information such as gas temperature and gas pressure, convert the gas volume value measured by the gas meter in operating mode into a gas volume value in the so-called "standard state" (temperature and pressure correction of the gas volume), may be connected to the rotary gas meter.

On the other hand, so-called HF applications are known. In this instance, industrial turbine flow meters are used, which rotate at high revolutions. Here also, additional flow computers (for example, volume converters, etc.), which use the HF signal as an input signal, are connected for individual tasks.

Thus far, it has not yet, however, been known to switch between these two types of application or to shift from one type of application to another.

The subject matter of publication U.S. Pat. No. 6,612,188 B2 has made a batteryless counter using a Wiegand sensor known, which Wiegand sensor is solely intended to supply power to the trip circuit.

The mentioned publication only discloses a counting circuit without describing an evaluation of the counting pulses. For this reason, it is disadvantageous that the power supply by the Wiegand sensor only supplies power to the counting circuit but not to the evaluation circuits further connected thereto.

Moreover, it is further disadvantageous that the pulses generated by the Wiegand sensor used in this instance are unclear and difficult to process. Therefore, the operating reliability of such a circuit is limited.

The subject matter of the publication DE 102 59 223 B3 or EP 0 658 745 B1 has made a position detector known, which in the most simple case actuates a Wiegand sensor, which there is referred to as a pulse wire, by two pulse coils, and all of the information necessary for a counting are simultaneously provided from the tripping direction of the magnetism reversal and the magnetism reversal direction of the pulse wire together with the most recently determined and stored position and polarity.

The power supply for the electronic evaluation system results from the signals of induction coils SP, SP1 and SP2. If only one induction coil SP is used, then this coil supplies a Hall Effect magnetometer with power.

A disadvantage in this arrangement is that a complex circuit is provided which is not capable of providing additional pulse frequencies.

The cost associated with additional pulse converter circuits could be reduced by providing additional pulse frequencies from the signal of the Wiegand sensor, enabling a more simple evaluation at the output of the batteryless signal transmitter. Thus, a universal application would be provided.

In the cited publications, it is further disadvantageous that the evaluation circuit installed downstream of the Wiegand sensor may affect the pulse shaping of the counting pulses in a disadvantageous manner. In these publications, the pulse generated by the Wiegand sensor is not guided to the outside but is used internally in a complex counting circuit, at which output a counted and evaluated value appears. In such circuits, the processed counting pulses cannot be outwardly diverted.

For this reason, the object of the present invention is to further refine a batteryless counter having a Wiegand sensor of the art mentioned at the outset in such a manner that it is capable of outwardly providing the internally processed pulses to the customer and that the outwardly diverted pulses do not react to the counted pulses of the counting circuit. These additional outwardly diverted pulses may, in relation to the generated pulses of the Wiegand sensor, be adjustably designed according to frequency and pulse shape.

In order to achieve the presented object, the present invention is characterized by the technical teaching of claim 1.

An essential feature of the present invention is that the batteryless signal transmitter having the Wiegand sensor substantially feeds the pulses generated by the Wiegand sensor to an isolator, which may, for example, be designed as a MOSFET, and that at the output of this isolator a pulse circuit is situated for processing the pulses, which in the most simple case selectively converts the counted pulses into pulses having a long pulse length or having a short pulse length and that further both types of pulses are provided at the output of the batteryless counter for further processing. Using an isolator in a highly insolated embodiment, for example, in the design of a MOSFET, has the advantage that practically no leakage currents are generated, which could impact the efficiency of the Wiegand sensor.

The pulse length of the counting pulses generated by the Wiegand sensor is thus adjustable, and the type of pulses which only have a small pulse width are, for the purpose of simplifying, referred to as HF pulses, while the pulses which have a relatively long pulse duration are referred to as LF pulses.

In this instance, the use and the presence of the counting circuit is optional—the combination with a real count is thus not mandatory.

The HF pulses may be used for metering revving turbines without the risk that the pulses generated in this manner overlap one another.

In low speed applications, the LF pulses are preferably used.

In order to generate these HF/LF signals, the energy pulse generated by the Wiegand sensor is directed via a parallel circuit for a first signal processing (which is used for the already known counting process). For this purpose, the Wiegand actuates the previously mentioned MOSFET. Starting from this first MOSFET, the circuit for generating the HF/LF signal is operated. In this way, nearly no electrical energy is withdrawn from the Wiegand system, which could interfere with the main function (counting process). A jumper or selector enables to switch between the signal processing of HF or LF signals and, for this purpose, the same circuit may be used which requires minimal circuit effort.

Using a MOSFET as an isolator has the advantage that a relatively weak signal of the Wiegand sensor may be used non-reactively and consumes the least power.

A further embodiment of the present invention also provides that the pulses of the HF/LF signals are adjustably designed.

Accordingly, the advantages of the present invention are that the amplitude, frequency and duration of the HF/LF pulse are adjustable and that, owing to the isolator according to the present invention, the actual batteryless counting is not impacted. Easily detectible, rectangular pulses are generated; this is in contrast to a plurality of known sensors and signal transmitters which are only capable of generating sinus-shaped signals/pulses (for example, capacitive, inductive, etc. sensors).

Such devices for generating pulses, such as those used in the gas sector and which operate with one of the above mentioned sensor principles/signal transmitters, may now be omitted because, according to the present invention, this function, which, moreover, advantageously has rectangular output signals, may be taken over by a batteryless counter.

Such sensors/signal transmitters belonging to the related art require their own power supply. Such a power supply has to be externally fed or generated by a battery.

According to the present invention, power has to be supplied externally for the HF/LF signals in conjunction with the batteryless counter; however, this power is supplied from the customer side and, that is, by the customer evaluation circuit provided by the customer (for example, by a flow computer, volume converter, etc.), which further processes the rectangular signals present at the output of the batteryless counter. Furthermore, power is only supplied then, when one of the customer evaluation circuits use the pulses and the customer evaluation circuits are, in this way, additionally connected to the batteryless counter.

Here it suffices to install in the area of the customer evaluation circuit a simple power supply, which is, for example, designed as an AC/DC converter or a battery. In this instance, it is important that this external power supply solely and exclusively acts upon the pulse selection circuit in the batteryless counter, but does not impact the counting circuit processing the signals of the Wiegand sensor and also that it is not necessary that this counting circuit is supplied with power. Since only one part of the batteryless signal transmitter, that is, only the pulse selection circuit is solely supplied by the external power, a particularly long battery life results, ranging in the area of 10 to 20 years.

Hence, it is important that an additional sensor/signal transmitter for detecting the signals of a rotating magnetic field can be omitted, which in a disadvantageous manner generates sinus signals, and that, according to the present invention, a Wiegand sensor and a batteryless signal transmitter, which is self-powered, carry out a processing into the rectangular shape instead, which has not been the case in the related art.

In a further refinement of the present invention, a variable assignment of HF/LF pulses to the Wiegand pulses is provided.

Figure 2:
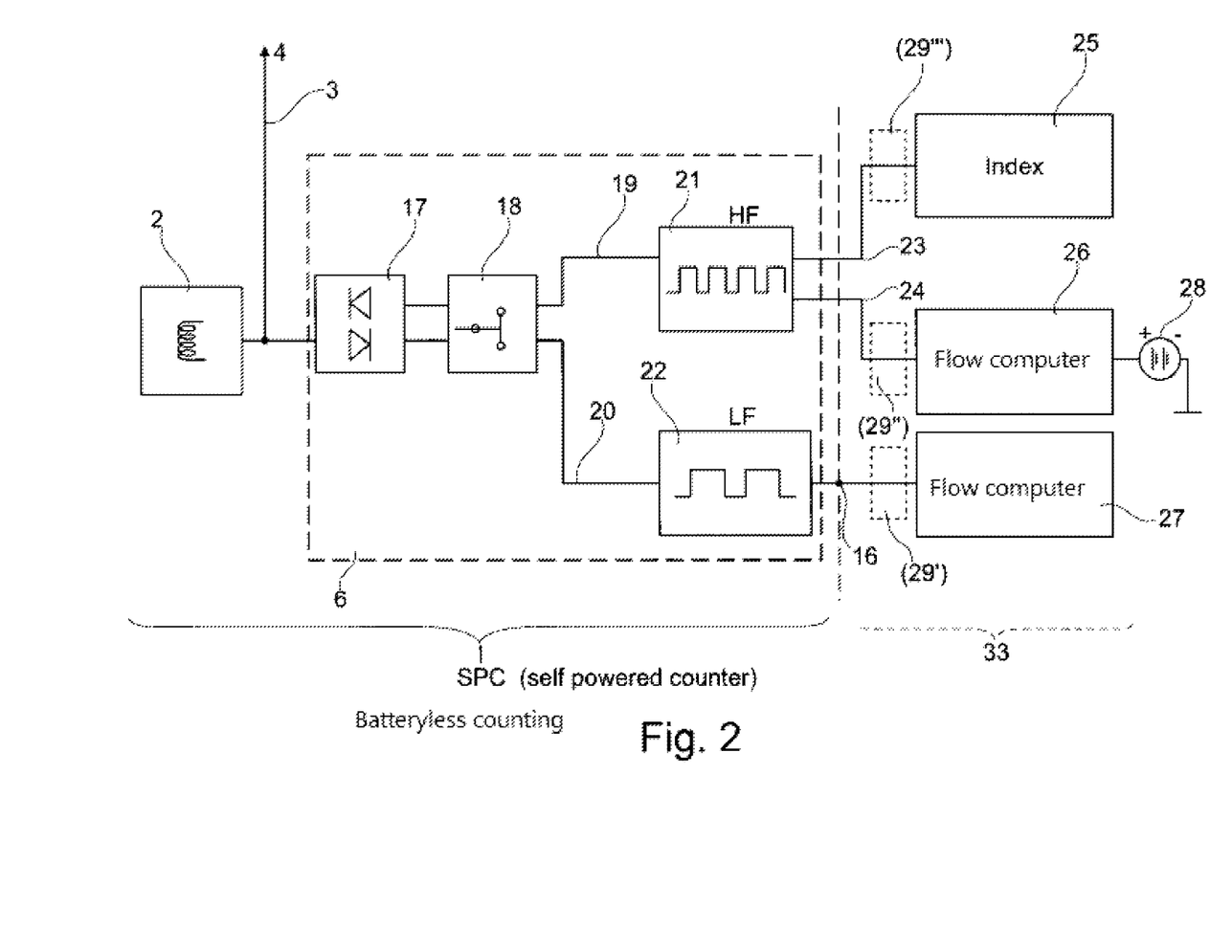
FIG. 2 shows a block circuit diagram which is more refined vis-à-vis FIG. 1 by illustrating further customer evaluation circuits to be externally connected.

The HF/LF pulses primarily serve as input signals for the flow computers additionally or alternatively connectable (see FIG. 2).

For example, a variety of gear translations may, for this reason, be omitted in the gas meter and the gear translation may be programmed into the SPC (self-powered counter). Gear translation 0.5 corresponds, for example, to pulse translation 0.5. The downstream flow computer (see FIG. 2) may then remain unchanged—old gas meters may be readily exchanged with new meters (not having mechanical gears and having an SPC), without having to exchange the downstream devices.

The present invention discloses a plurality of pulse translations, and the ratio of the pulse translations may be selected completely freely.

A pulse selection circuit having a micro controller, which preferably is also supplied via the HF/LF lines (having intermediately stored energy reservoirs), is preferably selected for this pulse translation. Owing to the Wiegand pulse, the power supply may not be carried out. The micro controller may freely choose selectable translations between 0 . . . (1) . . . X. In this instance, a translation of 0.5 means that 10 Wiegand pulses correspond to 5 HF/LF pulses (10 Wiegand pulses×0.5=5 HF/LF pulses).

Instead of micro controllers, other electronic semiconductor components may be used also (for example, decade counter components); however, the translation then would not be continuously selectable via software.

If a micro controller is used, adjusting the pulse length (HF-LF difference) may also be realized via software. The discrete circuit in FIG. 3 then would be obsolete.

The subject of the present invention not only results from the subject of the individual patent claims but also from combining the individual patent claims with one another.

All information and features disclosed in the documents, including the abstract, in particular the embodiments spatially illustrated in the drawings, are claimed as substantial to the present invention, as far as they are new, individually or in combination, vis-à-vis the related art.

In the following, the drawings illustrate the present invention in more detail with reference to only one embodiment. In this instance, further features and advantages of the present invention substantial to the present invention result from the drawings and their description.

Figure 1:
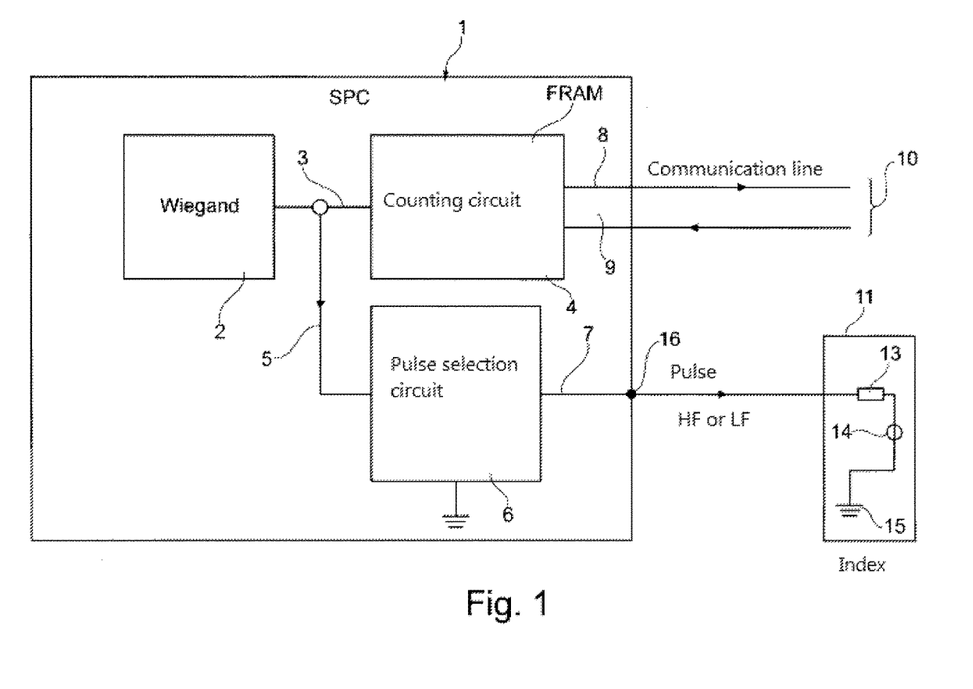
FIG. 1 shows a block circuit diagram of a batteryless counter.

Batteryless counter 1 in FIGS. 1 and 2 is self-powered. This means that it does not depend on an external power supply such as from a battery or an external power feed.

The entire assembly of the batteryless counter is housed in a tubular housing having an outer diameter of, for example, 30 mm and a length of 40 mm, which results in that such a tubular housing may be screwed into a gas or water meter, in the interior of which a turbine wheel rotates occupied by one or more permanent magnets. This rotating magnet field is detected by Wiegand sensor 2 and converted to pulses in a manner known per se, which are supplied via line 3 to a counting circuit 4. Counting circuit 4 counts the incoming pulses per unit of time depending on the upwards or downwards rotary direction and stores this counting value in a FRAM (ferroelectric random access memory).

At the output of the counting circuit, lines 8 and 9 are connected in this instance, which may be tapped at the housing of the batteryless counter and may be fed to one or a plurality of display or evaluation circuits 10 via a communication line. In an exemplary manner, lines 8, 9 are designed as a serial bus. A line 5 forming the input of a pulse selection circuit 6 branches off line 3. This pulse selection circuit enables to translate the signals generated by the Wiegand sensor into other signal shapes. For example, in this instance it is selected whether an LF signal or an HF signal is to appear at the output of line 7.

The customer who uses this batteryless counter in a water or gas meter may first select from the pulse selection circuit which type of pulses to use on line 7.

These signals are provided at connecting point 16 of batteryless counter 1 and are guided into a customer circuit 11 in which at least one resistor 13, a voltage source 14 and a ground line 15 are situated.

In this instance, it is important that solely voltage source 14 supplies pulse selection circuit 6 via line 7 and connecting point 16 with power to keep the therein included elements operable.

Pulse selection circuit 6 is supplied by an external power supply, by which the amplitude of output pulses 30, 32 may also be adjusted.

Figure 3:
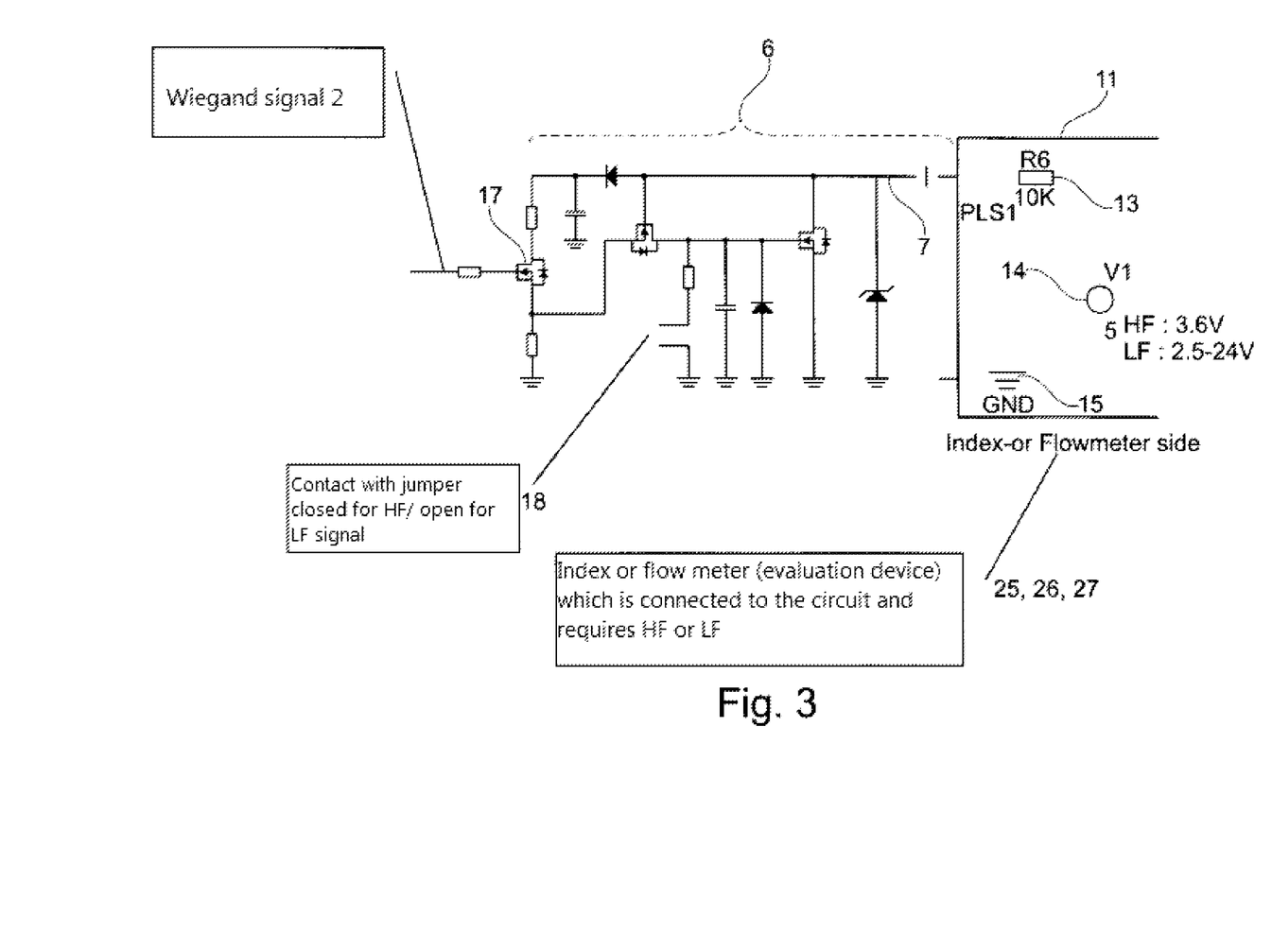
FIG. 3 shows a more refined circuit diagram in comparison to FIGS. 1 and 2.

In pulse selection circuit 6, only discrete electronic elements, which are illustrated in FIG. 3, are included in the simplest form, that is, for example, rectifier diodes, capacitors and MOSFETs as well as resistors, so that these are standard components.

FIG. 3 shows a more refined exemplary embodiment in comparison to FIG. 1, in which the generated and processed signals or pulses 31 of Wiegand sensor 2 are fed via a resistor to isolator 17 designed as a highly isolated MOSFET. In this way, any reaction of the signals in pulse selection circuit 6 via line 5 onto Wiegand sensor 2 is prevented.

Moreover, the pulse selection circuit includes further, previously mentioned components, and it is important that, for example, a jumper 18 may carry out a simple pulse duration setting. Subsequently, HF or selectively LF signals are provided for the further evaluation via line 7.

As shown in FIG. 3, it is important that customer evaluation circuit or customer circuit 11 may have any design. For example, it may be designed as flow computer 26, 27, or also as any customer evaluation circuit. This will be described in further detail later.

Figure 4:
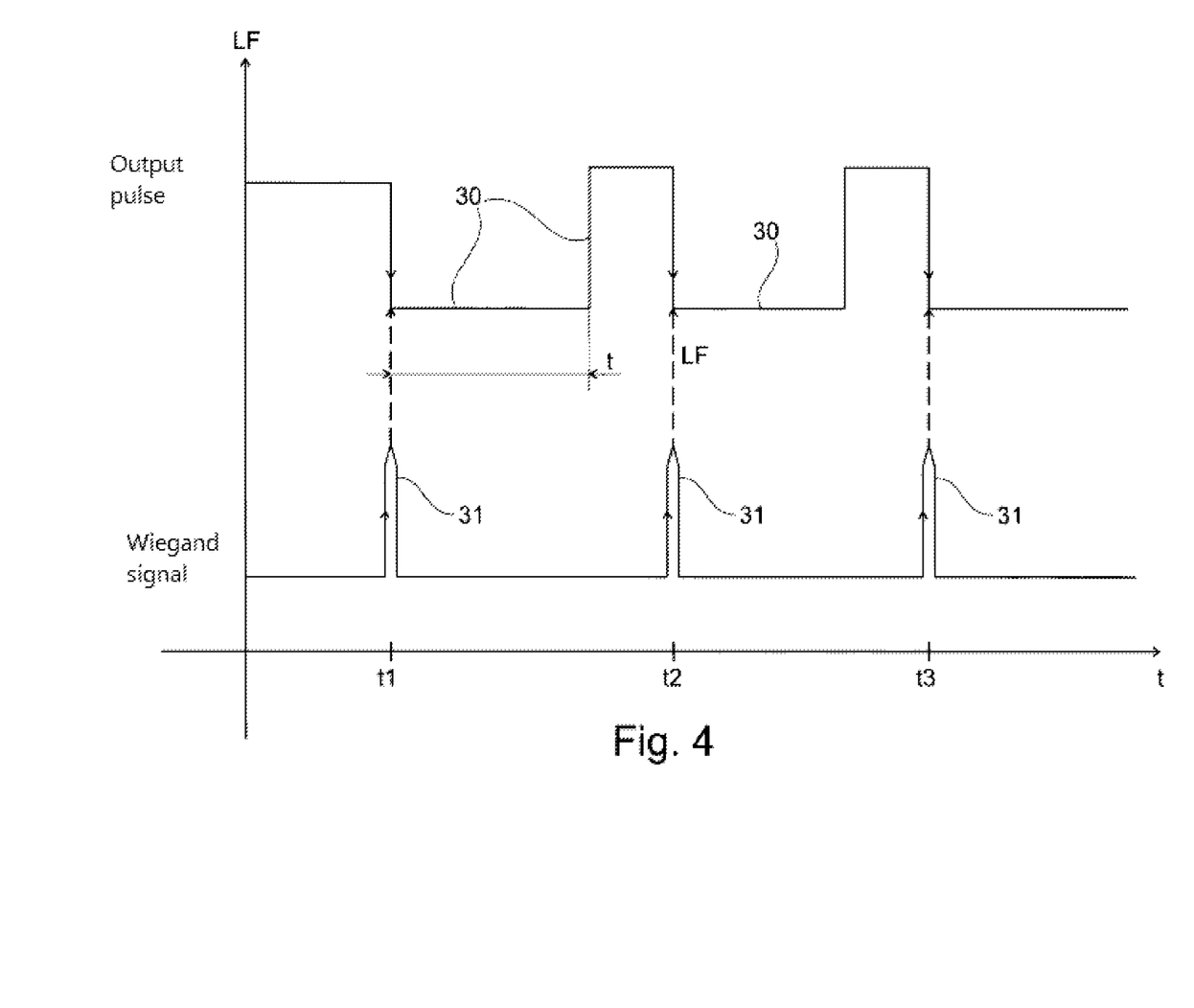
FIG. 4 shows the signal diagram of the LF pulses generated by the circuit.

As an example for generating LF signals, FIG. 4 shows that a relatively long pulse duration is generated from Wiegand pulses 31 at points in time t1, t2 and t3. The rising flank of each Wiegand pulse 31 initiates the signal shaping of the LF signal which, in this way, shapes output pulse LF and which has a specified duration, and duration $t_{LF}$ may not exceed the time interval between Wiegand pulses 31.

Wiegand pulses 31 are rectified.

Figure 5:
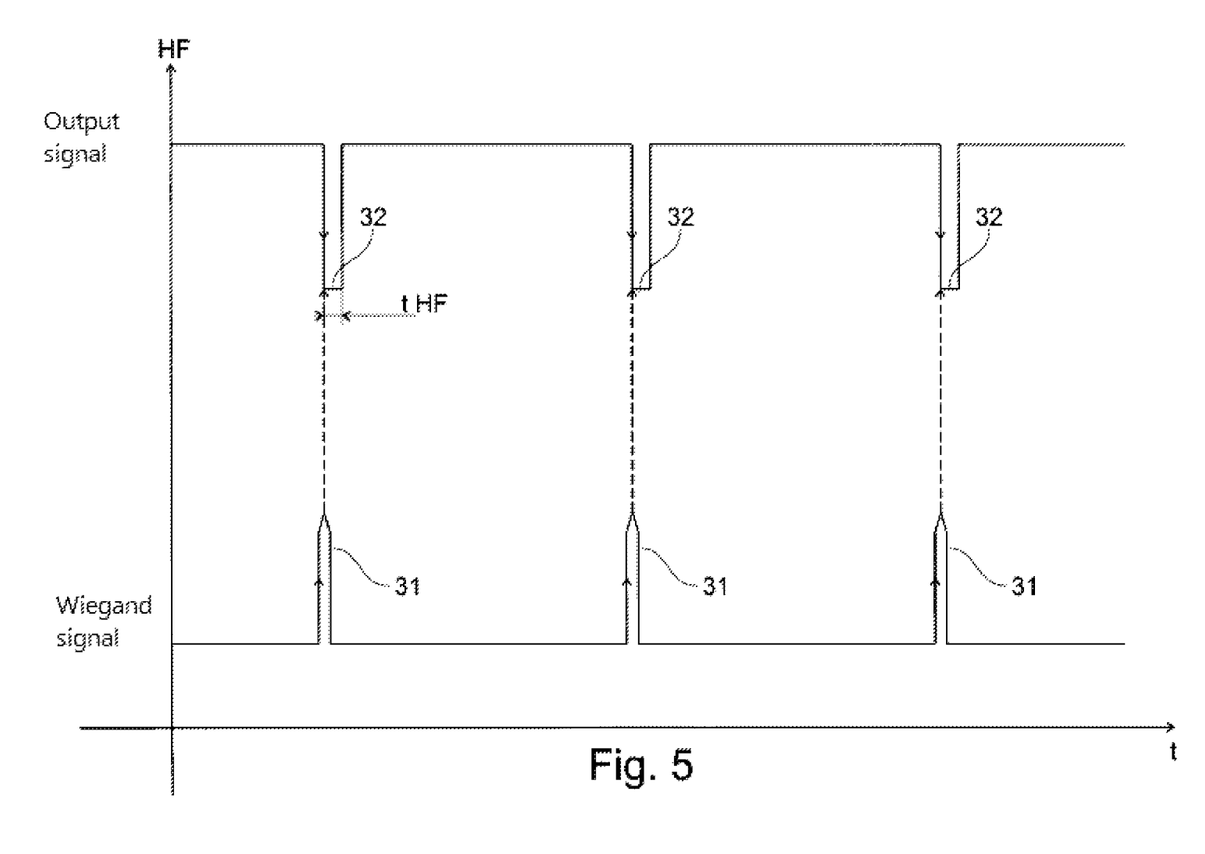
FIG. 5 shows the signal diagram of the HF pulses generated by the circuit.

FIG. 5 shows the same illustration in an analogous manner, where it can be seen that very small output pulses HF having a short pulse duration may be shaped by a duration $t_{HF}$ from rectified Wiegand pulses 31. Such output pulses 32 are used primarily in applications rotating at high speed.

FIG. 2 shows the advantage of the present invention by a dashed line in that it illustrates that previously necessary sensors/signal transmitters 29, which are made up of a sensor and an evaluation circuit, may be omitted. In the related art, instead of the single batteryless counter 1, signal transmitters 29', 29'' and 29''' could have been disposed.

It is evident that when such sensors/signal transmitters 29', 29'' and 29''' are present, sinus-shaped pulses and signals, which in part are very difficult to process, may be generated which then in the downstream customer evaluation circuits 25, 26, 27 result in more complicated processing, mostly to the preferred rectangular pulse shape.

In order to prevent such disadvantages, it is then known to provide comprehensive signal processing in customer evaluation circuits 25, 26, 27, which may be omitted in the present invention. In the present invention, the signal processing is already relocated into batteryless counter 1.

The block circuit diagram according to FIG. 2 illustrates that pulse duration setting 18 adjusted via jumpers generates via line 19 a pulse length block 21, which generates HF pulses and is provided at the output via lines 23, 24, while via line 20 a pulse length block 22 is provided for LF pulses, which are provided at connecting point 16.

Figure 6:
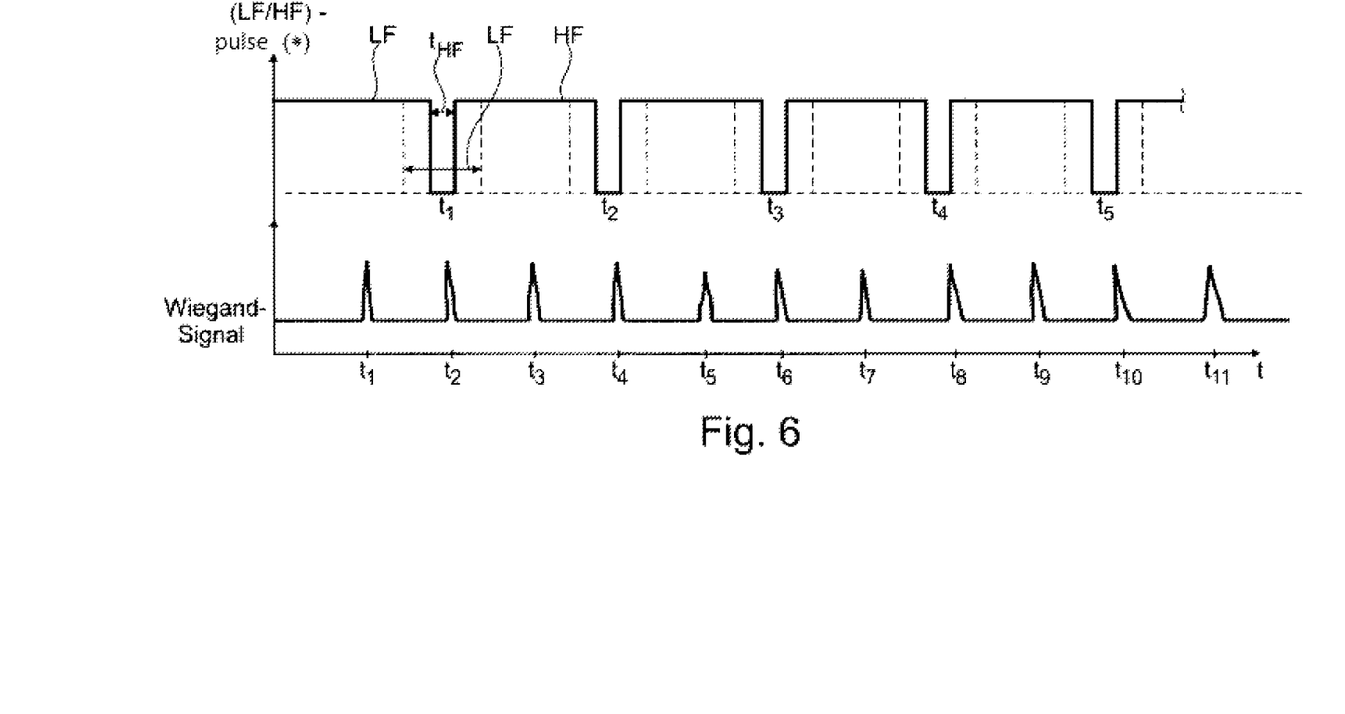
FIG. 6 shows a first exemplary embodiment for a variable assignment of HF/LF pulses to the Wiegand pulses, and a programmed pulse translation of 0.5 is applied.

FIG. 6 shows a programmed pulse translation of 0.5. This means that 10 Wiegand pulses correspond to 5 HF/LF pulses. Accordingly, this concerns a programmed pulse translation of 10×0.5=5.

In the previous exemplary embodiments, the term HF/LF referred to the pulse length (the difference of pulse lengths). For a variable, programmable number of HF/LF pulses, the pulse length may, for example, via a micro controller in the pulse selection circuit, also be specified or programmed per number of Wiegand pulses by the micro controller. A discrete circuit such as in FIG. 3 (circuit without micro controller) is then obsolete.

In the top illustration in FIG. 6, HF pulses are respectively illustrated by solid lines, while LF pulses are illustrated by dashed lines.

The pulse interval of the HF pulses is $t_{HF}$, while the pulse interval of the LF pulses has the value $t_{LF}$.

In the bottom illustration, the respective Wiegand signals are drawn in at times $t_1$ through $t_{11}$.

Figure 7:
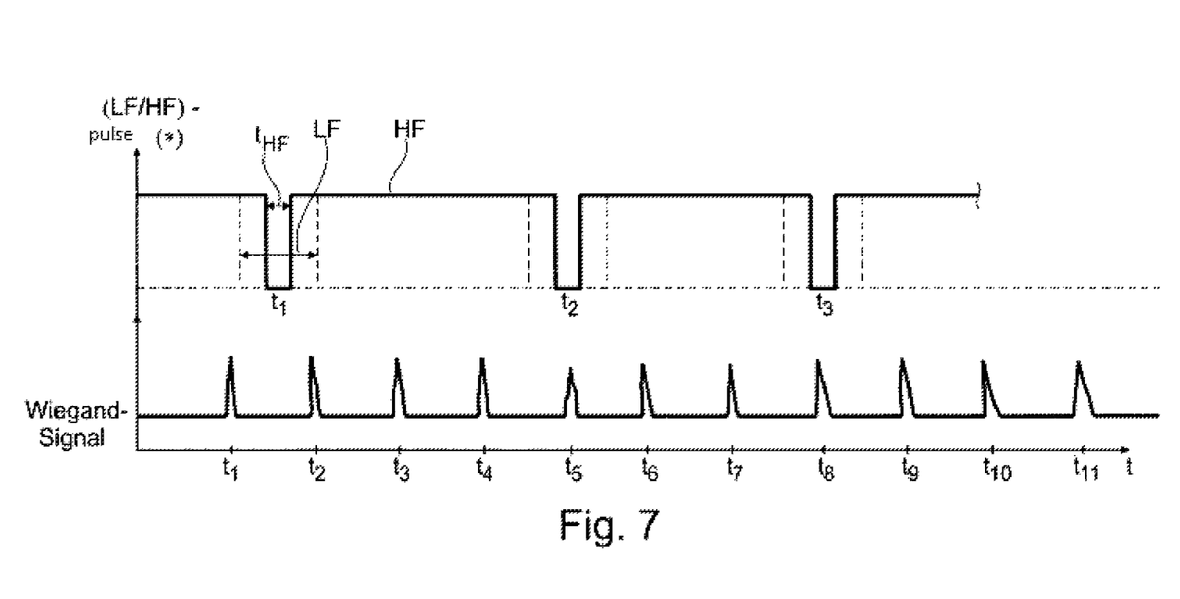
FIG. 7 shows a second exemplary embodiment in comparison to FIG. 6, and a programmed pulse translation of 0.3 is applied.

The same explanations from FIG. 6 apply to FIG. 7 and the same references are entered.

In FIG. 7, a programmed pulse translation of 0.3 is drawn in. 10 Wiegand pulses correspond to 3 HF/LF pulses.

Figure 8:
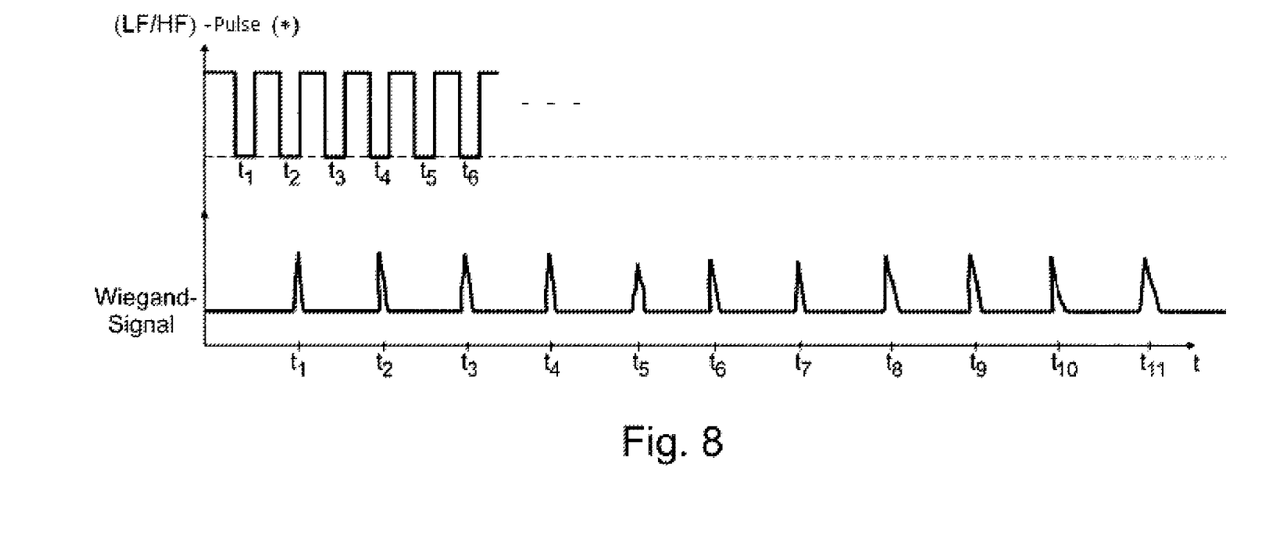
FIG. 8 shows a third exemplary embodiment in comparison to FIGS. 6 and 7, and a programmed pulse translation of 0.2 is applied.

The same previous descriptions also apply to FIG. 8. In this instance, a programmed pulse translation of 0.2 is graphically illustrated. 10 Wiegand pulses correspond to approximately 20 HF/LF pulses.

LIST OF REFERENCE CHARACTERS 1 batteryless counter
2 Wiegand sensor
3 line
4 counting circuit
5 line
6 pulse selection circuit
7 line
8 line
9 line
10 display and evaluation circuit
11 customer circuit
12
13 resistor
14 voltage source
15 ground line
16 connecting point
17 isolator
18 pulse duration setting
19 line
20 line
21 pulse length block
22 pulse length block
23 line 24 line
25 customer evaluation circuit
26 customer evaluation circuit
27 customer evaluation circuit
28
29 signal transmitters 29', 29", 29'''
30
31 Wiegand pulse
32 output pulse
33

What is claimed is:

1. A batteryless counter (1) for gas or water meters comprising at least one Wiegand sensor (2) as a power generating element and an evaluation circuit (10) connected thereto for processing a pulse (31), wherein the batteryless counter feeds the pulses (31) generated and processed by the Wiegand sensor (2) to an isolator (17), and at the output of this isolator (17) a pulse selection circuit (6) comprising a pulse duration setting (18) is disposed, which processes the pulses (31) simultaneously counted via a counting circuit (4) by a pulse selection circuit (6) and converts the other pulse shapes/pulse frequencies and guides them outwards, wherein a variable assignment of the HF/LF pulses (30, 32) to Wiegand pulses (31) having a variable pulse translation is provided.

2. The batteryless counter (1) according to claim 1, wherein the isolator (17) is designed as a MOSFET.

3. The batteryless counter (1) according to claim 1, wherein the isolator (17) and the pulse duration setting (18) are disposed in the pulse selection circuit (6).

4. The batteryless counter (1) according to claim 1, wherein the output pulse (30, 32) is provided at the output of the batteryless counter (1) for processing.

5. The batteryless counter (1) according to claim 1, wherein the pulse selection circuit (6) is supplied by an external power supply.

6. The batteryless counter (1) according to claim 1, further comprising an external customer evaluation circuit comprising a voltage source (14) supplies the pulse selection circuit (6) with power.

7. The batteryless counter (1) according to claim 6, wherein the external customer evaluation circuit is designed as a volume converter, index meter or flow meter, which further processes the output pulses (30, 32) provided as rectangular signals.

8. The batteryless counter (1) according to claim 1, wherein the counting circuit is housed in a tubular housing in which a gas or water meter may be installed.

9. The batteryless counter (1) according to claim 1, wherein the Wiegand sensor (2) detects the rotating magnet field of a turbine wheel and converts the rotating magnet field into pulses (31), which are guided into a counting circuit (4) and are stored in a ferroelectric random access memory (FRAM).

10. The batteryless counter (1) according to claim 9, wherein the turbine wheel is occupied by one or a plurality of permanent magnets.

* * * * *